(12) United States Patent
Stricker

(10) Patent No.: US 6,653,744 B2
(45) Date of Patent: Nov. 25, 2003

(54) DISTRIBUTED GENERATION DRIVETRAIN (DGD) CONTROLLER FOR APPLICATION TO WIND TURBINE AND OCEAN CURRENT TURBINE GENERATORS

(75) Inventor: Peter Stricker, Santa Barbara, CA (US)

(73) Assignee: Clipper Wind Technology, Inc., Carpenteria, CA (US)

( * ) Notice: Subject to any disclaimer, the term of this patent is extended or adjusted under 35 U.S.C. 154(b) by 0 days.

(21) Appl. No.: 09/920,247

(22) Filed: Jul. 31, 2001

(65) Prior Publication Data

US 2002/0014773 A1 Feb. 7, 2002

Related U.S. Application Data

(60) Provisional application No. 60/222,149, filed on Aug. 1, 2000.

(51) Int. Cl.$^7$ .................................................. H02P 9/04
(52) U.S. Cl. .............................. 290/6; 322/36; 322/44
(58) Field of Search ............................ 290/6, 44; 322/36

(56) References Cited

U.S. PATENT DOCUMENTS

| | | | | |
|---|---|---|---|---|
| 4,213,436 A | * | 7/1980 | Burson ........................ 123/599 |
| 4,636,707 A | * | 1/1987 | Law ............................. 322/35 |
| 5,083,039 A | * | 1/1992 | Richardson et al. ........... 290/44 |
| 5,823,280 A | * | 10/1998 | Lateur et al. ............... 180/65.2 |
| 5,905,646 A | * | 5/1999 | Crewson et al. ............. 363/132 |
| 6,448,735 B1 | * | 9/2002 | Gokhale et al. ............. 318/700 |

* cited by examiner

Primary Examiner—Nestor Ramirez
Assistant Examiner—Leda T. Pham
(74) Attorney, Agent, or Firm—Owen L. Lamb

(57) ABSTRACT

A wind or ocean turbine has an input-power shaft-mounted, rotating bull-gear with smaller stationary pinion-driven powertrains including generators mounted around the periphery of the bull-gear. A controller regulates torque experienced by each powertrain to balance torque between generators at any system load. Regulation includes controlling local voltage at each generator by a transformer configured as a reactor. Coils of the transformers are wired in parallel and actively modulated with an SOR, solid-state, switching device. Each generator output is connected to a respective primary coil of a transformer and a respective secondary coil is connected to an SCR. By using pulse width modulation, the SCR is gated on and off for a portion of a 60 Hz cycle. By adjusting the duty cycle of SCR gating, any voltage between 80% and 100% is attained to satisfy immediate torque requirements.

10 Claims, 5 Drawing Sheets

SCR-T CONTROL SCHEME - ONE-LINE DIAGRAM

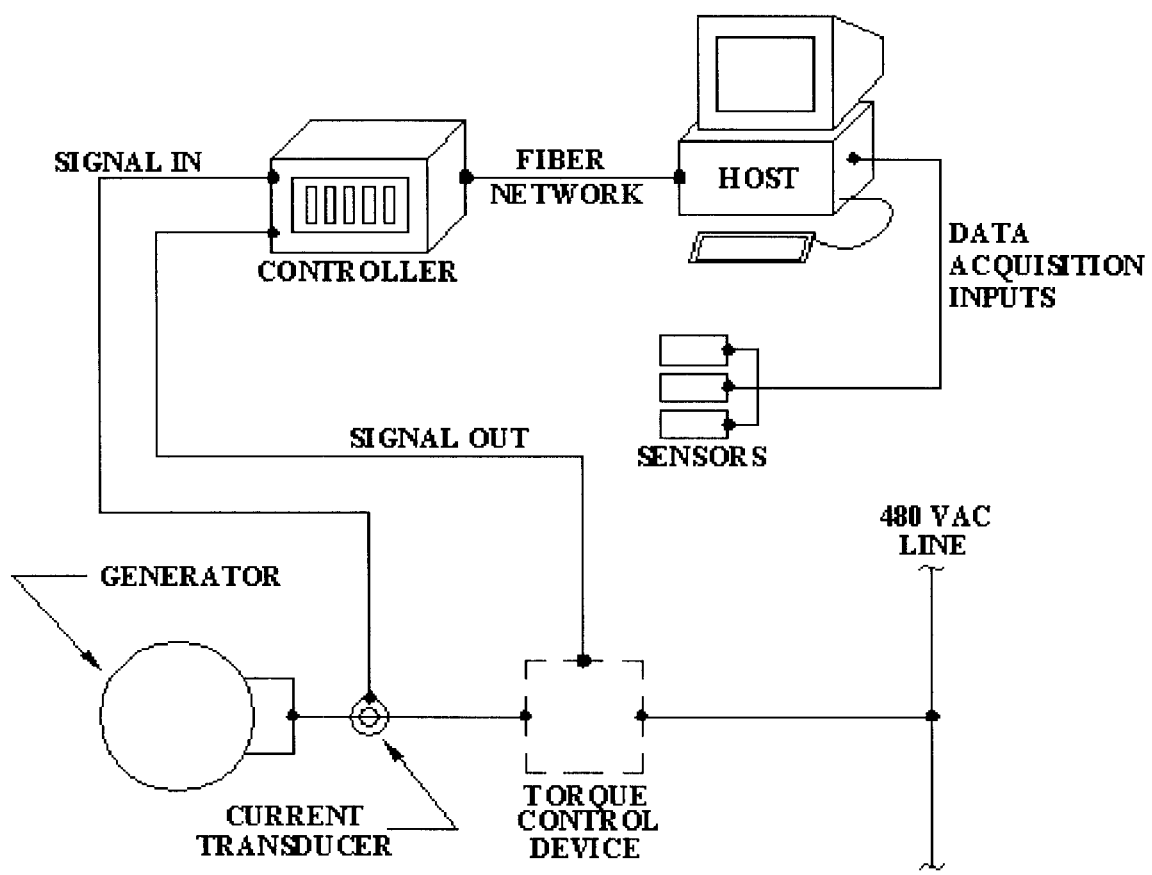
FIGURE 1 - DGD CONTROL SYSTEM

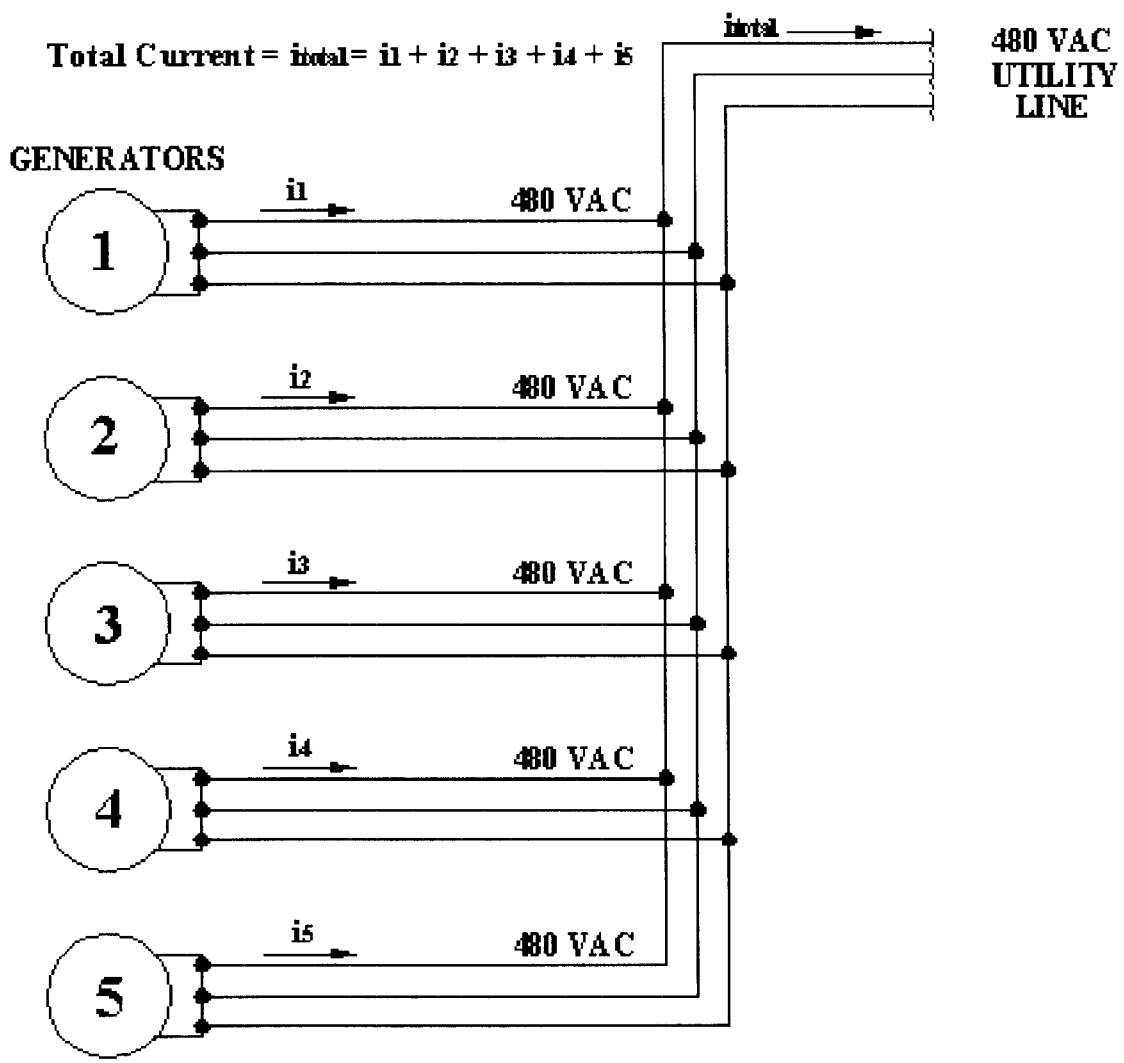
FIGURE 2 - INDUCTION GENERATORS IN PARALLEL CONFIGURATION

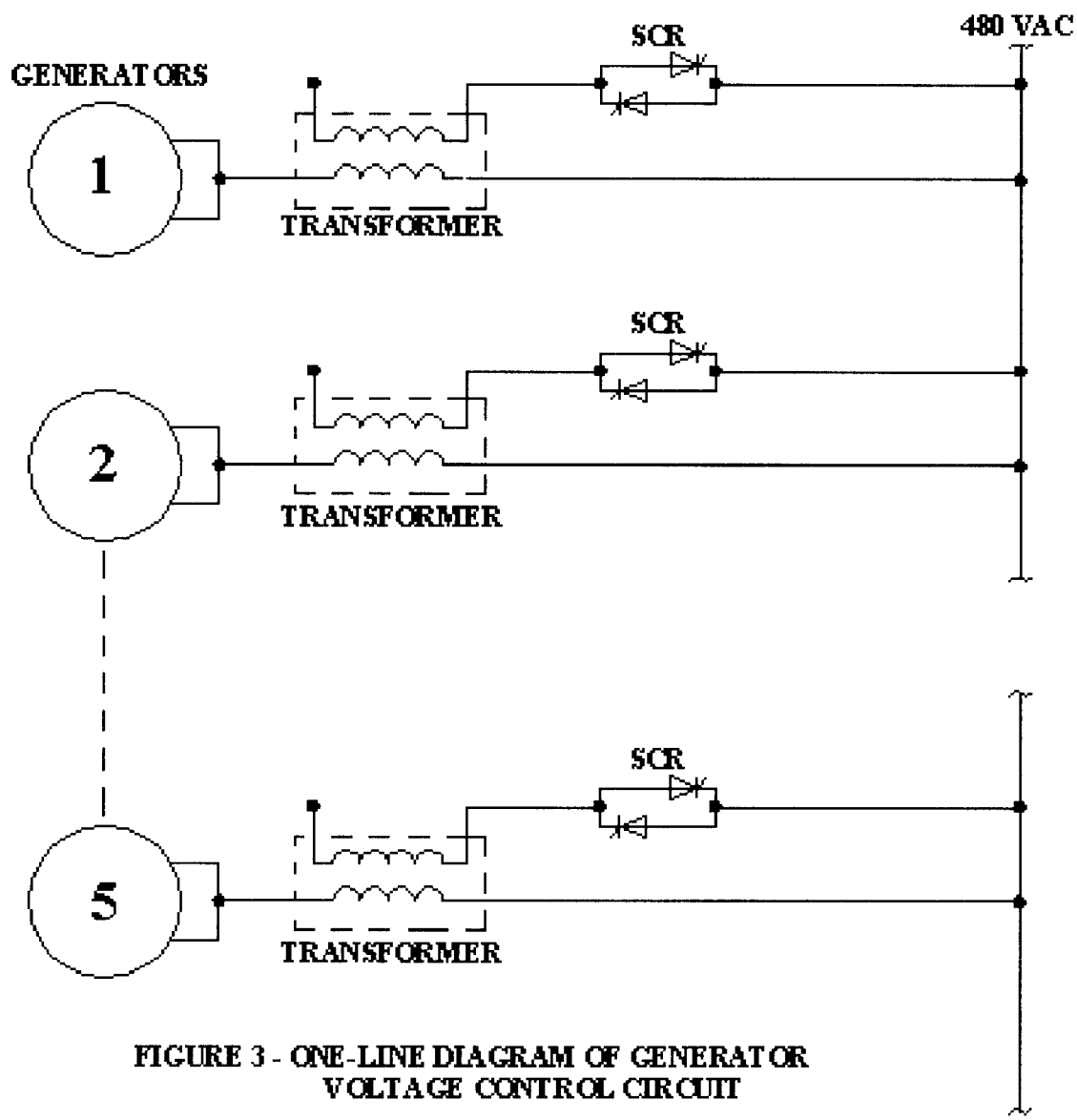
FIGURE 3 - ONE-LINE DIAGRAM OF GENERATOR VOLTAGE CONTROL CIRCUIT

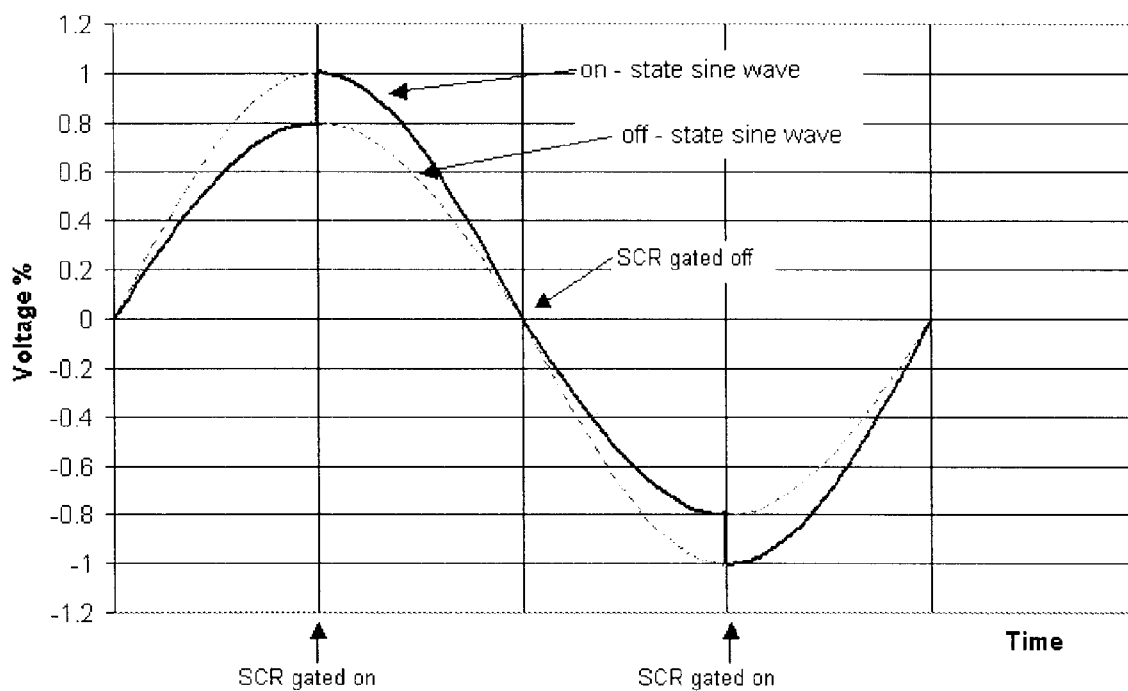

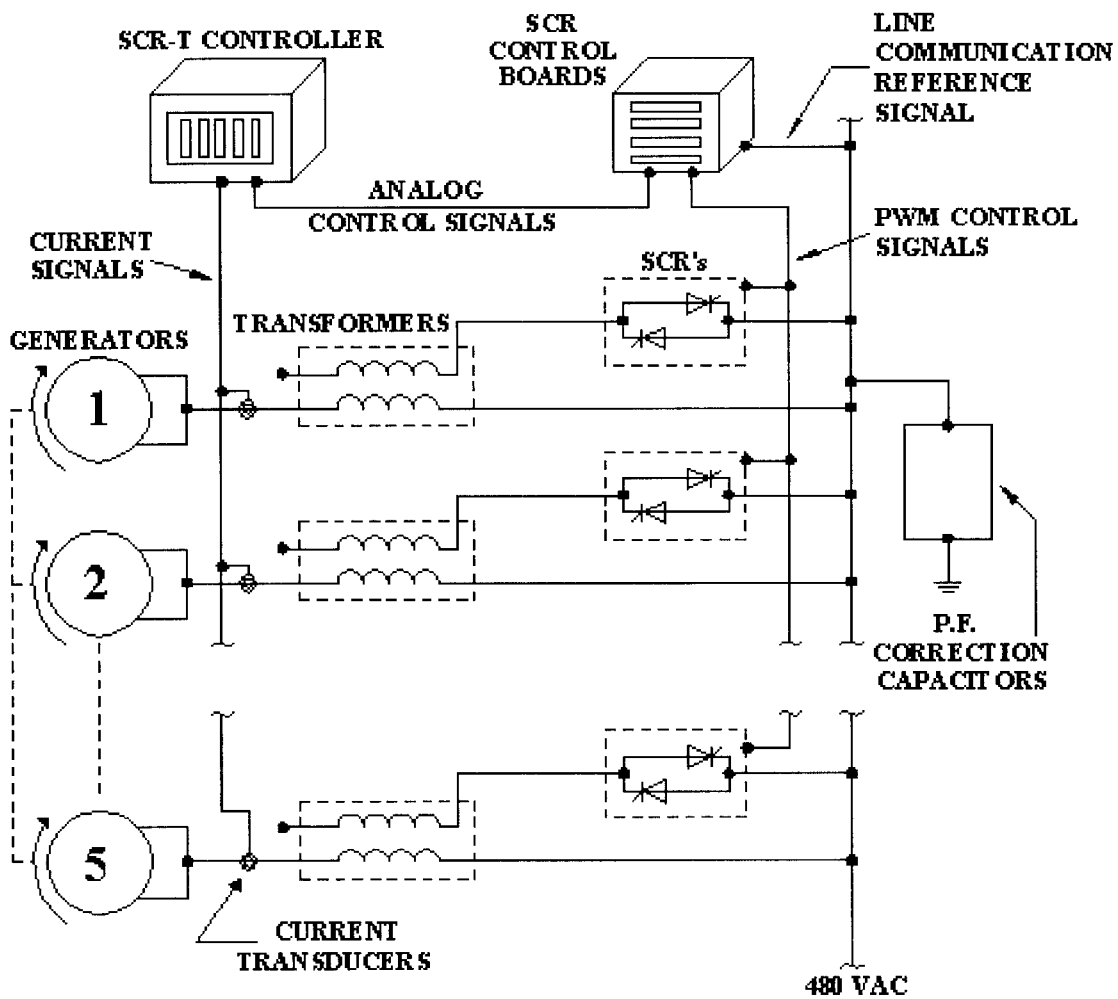
FIGURE 5 - SCR-T CONTROL SCHEME - ONE-LINE DIAGRAM

DISTRIBUTED GENERATION DRIVETRAIN (DGD) CONTROLLER FOR APPLICATION TO WIND TURBINE AND OCEAN CURRENT TURBINE GENERATORS

CROSS-REFERENCE TO RELATED APPLICATIONS

This application is related to application Ser. No. 09/552,577 of Dehisen, et al. filed Apr. 19, 2000 entitled "Distributed Powertrain For High Torque, Low Rpm, Electric Power Generator", and provisional application Ser. No. 60/222,149 of Stricker, et al. filed Aug. 1, 2000, entitled "Distributed Generation Drivetrain (DGD) Controller For Application To Wind Turbine And Ocean Current Turbine Generators" both assigned to the assignee of this invention, and incorporated herein by reference.

BACKGROUND OF THE INVENTION

1. Field of the Invention

This invention relates to electric power-generating devices such as wind turbines and ocean current turbines, and more particularly to a method and apparatus for taking the mechanical output of a low rotational velocity high-torque wind or water turbine and converting that to 3-phase electrical power to a utility line.

2. Description of the Prior Art

Many electric power-generating devices, such as wind turbines and ocean current turbines, benefit from economies of scale, yielding lower costs for generated electricity with larger power generation per unit. This increase in power is often accompanied by a reduction in rotational velocity of the power-input shaft, resulting in a large increase in torque. Because electric generators require rotational velocities tens to hundreds of times greater than the rotational velocity of the input shaft, a speed-increasing gearbox is often applied between the power-input shaft and the generator.

The above-referenced Dehlsen, et al application Ser. No. 09/552,577 discloses a powertrain for wind turbines and ocean current turbines which consists of a large, input power shaft-mounted, rotating bull-gear with stationary smaller powertrains mounted around its periphery. The gear teeth on the bull-gear rotate past the teeth on the pinions, causing pinions to turn and deliver power to each smaller powertrain. Alternatively, powertrains are attached in a spindle around the perimeter of a main power input drive shaft, and rotate as the shaft rotates. The input drive shaft to each of the smaller powertrain gearboxes is fitted with a pinion. As the main power input shaft turns, the generators, gearboxes and pinions rotate, moving the pinions around the interior of a stationary ring gear. Reduction and distribution of torque is similar to the rotating bull-gear powertrain. In the bull-gear configuration, each smaller powertrain is stationary, reducing stress caused by rotation.

The power and control side of the powertrain must take the mechanical output from the individual second-stage gearboxes and produce 3-phase electrical power to a utility line. To perform successfully, this control system must assure a uniform torque load distribution between generators, smoothly connect and disconnect with the utility line, seek maximum operating efficiency, monitor and provide protection for mechanical and electrical parameters operating out of specification, and accommodate input from external systems and operators.

Therefore, besides generators, the power conversion system requires an appropriate controller to manage these tasks.

SUMMARY OF THE INVENTION

Briefly, the invention is concerned with a control method for use with an electric power-generating device that converts fluid flow of wind or water to electricity. The device includes a rotor having blades that rotate in response to fluid flow; a main power input shaft coupled to said rotor; a single-stage torque-dividing gearbox coupled to said main power input shaft; said torque-dividing gearbox having a plurality of output shafts located around a perimeter of said main power input shaft; and, a plurality of sub-powertrains, each one of said sub-powertrains including a generator coupled to a respective one of said torque-dividing gearbox output shafts, the control method comprising regulating torque experienced by each said generator to assure that torques are balanced between generators at any given system load.

In accordance with an aspect of the invention, the regulating step includes controlling local voltage at each said generator by a transformer configured as a reactor, in which coils of said transformers are wired in parallel and are actively modulated with an SCR, solid-state, switching device.

In accordance with another aspect of the invention, each generator is connected to a respective primary coil of a transformer and a respective secondary coil is connected to an SCR.

BRIEF DESCRIPTION OF THE DRAWINGS

The invention will be described in detail with reference to the drawings in which:

FIG. 1 is a schematic view of the preferred embodiment of the distributed powertrain control system;

FIG. 2 shows a schematic view of the induction generator of the present invention in parallel configuration;

FIG. 3, is a schematic view of a generator voltage control circuit in one-line configuration;

FIG. 4 is a diagram of a 60 Hz sine wave with SCR-T modulation; and,

FIG. 5 is a schematic diagram of a SCR-T control scheme.

DESCRIPTION OF THE PREFERRED EMBODIMENTS

FIG. 1 is a schematic view of the preferred embodiment of the distributed powertrain control system. The apparatus of Ser. No. 09/552,577 via a torque-dividing gearbox distributes a high input torque of a rotor between multiple powertrains, each consisting of a smaller conventional torque-reducing gearbox and generator. The sum of the power producing capacities of the generators is equal to the maximum power delivered by the power-input shaft, and is equivalent to the power produced by a single generator in a conventional system. This apparatus is referred to herein as a distributed generation drivetrain or DGD.

The present control system design incorporates an embedded, real time controller orchestrating control tasks with a host computer linked to it via a high-speed network. The host acts as the data-logging device and serves as the user interface, thus freeing the controller to attend to time-critical control functions without distraction. The host stores dynamic performance data to disk while its keyboard, mouse and display provide the operator with real-time status and the ability to initiate commands to the controller. When installed on a wind or ocean current turbine, this control system is integrated into the turbine's controller.

Induction generators have been identified as a desirable generator style for use as the mechanical-electrical power conversion on the DGD. Induction units were selected due to their low cost and suitability in a wind turbine loads environment. For the purposes of this specification, an example 200 kW DGD system consisting of five, 40 kW generators is presented. It will be understood by those skilled in the art that the DGD may be configured with any number of generators and sized for any desired power output.

These five generators are configured in parallel on a 480 Volt AC circuit. Arranged as such, each generator operates at 480 Volts (nominally) and the current from each sums to produce the total current output (see FIG. 2). If the torques are balanced the current output from each generator is equal, making the DGD's total current equal to five times the output of a single generator resulting on a total power output of 200 kW. Ultimately the existence of these five generators is transparent to the line as it sees only a single, three-phase output.

Synchronous generators have been less successful than induction units on wind turbines due to problems of speed control in gusting winds, and the requirement that the prime mover exactly match synchronous speed. However, it will be understood by those skilled in the art that the principles of the invention are applicable to synchronous generators.

Torque Control

An inherent problem with induction generators is the difficulty in manufacturing them on a standard production line to have precisely repeatable slip characteristics. By design, induction generators run faster than synchronous speed by some small percentage (typically 1.5% at full load) known as its slip, but from one unit to the next this slip varies by a small amount (nominally plus or minus 0.2%). On a 1200 RPM design this amounts to a possible variation of 5 RPM between generators with a nominal full slip range of 18 RPM; since the power output goes from zero at 1200 RPM to full load at 1218 plus or minus 2.5 RPM. This slip variability has a huge impact on the load sharing of generators all being driven at exactly the same speed. Thus, the heart of the DGD control function is to regulate the torque experienced by each induction generator and assure that the torques are balanced between generators at any given system load.

Various techniques of torque control for the DGD are possible. Both passive tuning and active control methods are possible. The more practical and cost effective of these are described in the paragraphs, which follow.

Series Resistance in the Rotor Circuit

A small series resistance is added in the rotor circuit. Increasing the rotor resistance has the effect of increasing the slip. In this case the slip characteristic of each generator is modified to match the unit with the greatest slip. This method is practical with wound rotor designs and may incur some, presumably small, resistive power loss. In addition, dynamometer testing of each generator is required for tuning resistance.

Using Inductors and Capacitors to Modify Generator Voltage

In this method inductors and capacitors are used to modify generator voltage. The inductors are configured to partially isolate each generator from the others and create a local voltage environment. The capacitors are then applied in parallel to each generator's local voltage environment to raise its voltage as needed. Since induction generators have an inherently lagging power factor, the addition of capacitive VAR support raises the voltage proportionately ("VAR support" is a common term in the utility industry, referring to the use of capacitance to offset lagging power factor and raise voltage on utility lines.) Raising the voltage tends to reduce slip, thus a prescribed capacitance is added to each generator to match the generator with the least slip. Adding capacitance has the secondary benefit of improving the power factor. Limitations to this technique are that dynamometer testing of each generator is required for tuning capacitance to determine how much capacitance is necessary to have the desired effect.

Configuring the Generators to be Wired in Series.

With this method all of the current passes through each generator and the voltage applied to each unit is nominally equal to 480 volts divided by the number of generators on line. The actual voltage at each generator varies depending on its relative slip characteristic, but because the current is exactly the same through all generators, the input torques are also precisely matched. Additional cost is incurred with this design because it requires that the generator windings be sized to carry the full rated system power. The generators must also be designed to be efficient over a wide range of applied voltages, depending on the number of generators on line.

Utilizing Silicon Controlled Rectifiers (SCRs)

In this method, Silicon Controlled Rectifiers (SCRs) and parallel-connected transformers are used to actively control generator voltage. Because this design allows full, active control of torque at all power levels, it is the preferred method over other torque balancing methods. A full range of operational performance can be evaluated with this control approach. If a fixed slip adjustment appears to resolve the torque balance issue over a range of power levels, as demonstrated with this controller, then passive-tuning methods may be employed. In addition, active control provides other functionality such as soft-starting and over torque protection for the DGD. This SCR-Transformer controller is described in detail in the following section.

SCR-Transformer Torque Controller

The key to the cost-effectiveness of the SCR-Transformer (SCR-T) Controller is a fundamental property of induction generators that greatly facilitates voltage regulated torque control, namely, torque is proportional to voltage squared. This relationship implies that only a small voltage change is required to produce a significant effect on torque. Thus, only minor variations from nominal line voltage will provide the necessary torque balance between generators, and the equipment required to modulate voltage is proportionately reduced in cost. To achieve control over the local voltage at each generator, a transformer (configured as a reactor, i.e. the coils are wired in parallel rather than series) is actively modulated with an SCR, solid-state, switching device. This concept applied to induction motor soft-starting is described in a paper by Walter Mientrup, "Siemens Power Engineering," Vol. 11, No. 3, March 1980, pp 83–85. This arrangement is shown in FIG. 3 as a one-line diagram of the example 200 kW system. The generator is connected to the "primary" coil of this transformer and the "secondary" is connected to the SCR.

The function of this system relies on the reactance of the primary transformer coil, which with no air gap in the core (see the next section on SCR-T Controller Design) would reduce the voltage at the generator to nearly zero when the secondary coil is open-circuited. As it is however, the presence of the air gap allows the "open-circuited" generator voltage to be some fraction of the line voltage (for example 80%). On the other hand, the shorted secondary condition allows full line voltage to appear on the generator. Thus when the SCR is gated on, full voltage is conducted to the generator and when it is off 80% of full voltage is conducted.

Because of the binary operation of the SCR, only two voltage states are possible at the generator terminals at any instant. Nonetheless, using pulse width modulation (PWM) techniques, the SCR may be gated on and off for a portion of the 60 Hz cycle allowing an average voltage between 80 and 100%. Thus, by adjusting the duty cycle of SCR gating, any voltage between 80 and 100% may be attained in order to satisfy immediate torque requirements. A plot of the 60 Hz waveform with the SCR-T controller managing the duty cycle is shown in FIG. 4. Those skilled in the art will realize that this technology may be applied to a 50 Hz line frequency as easily as to 60 Hz line frequency.

The control loop regulating torque first looks at the average of the three phase currents being produced by the generator then calculates the equivalent torque based on current. As soon as all generators have had the same readings and calculation performed, they are compared to determine the relative torque loading of each. Based on the relative torque ratios and the squared relationship of voltage to torque, the duty cycles of each of the fifteen SCRs (three phases of the example five generators) are adjusted to provide the proper voltage to bring the torques into balance. This loop executes fairly quickly (say at 10 Hz, using six readings taken and averaged once per cycle of the 60 Hz line) assuring that the torque balance is continuously maintained.

SCR-T Controller Design

In addition to the controller architecture described previously, the SCR-T controller requires transformers, SCRs, high-speed current transducers, and SCR control boards to complete the system. The necessary I/O is limited to current transducer (analog) inputs for each phase current and analog output voltages to the SCR control boards dictating the desired voltage levels. A circuit diagram of the SCR-T control system is shown in FIG. 5. Note that capacitors have been added to the output leads to correct the power factor to 0.95 for improved power quality. The design of the transformer involves specifying the following parameters to achieve the desired reactance and current carrying capabilities:

The required number of primary and secondary turns

The primary and secondary conductor sizes

The quantity and configuration of core iron

The size of the core air gap

The core geometry must include an air gap to lower the zero-state reactance. The size of this air gap in the magnetic circuit determines the magnitude of the reactance and thus the ratio between the coil reactance and the generator impedance. The relationship between coil reactance and generator inductance establishes the residual voltage to the generator when the SCRs are open circuited, which represents the control circuit's minimum voltage range.

SCR-T Controller For Wind Gust/Current Surge Control

Another important facet of the torque regulation capabilities of the SCR-T controller is its ability to increase/decrease slip by reducing torque, in response to variations in the prime mover input torque. This capability is especially significant to wind and ocean current turbine control where variations in the input torque occur on a regular basis as the rotors are subjected to wind gusts and surges in ocean current velocity.

Using the same principle and equipment that is applied to individual generator torque balancing on the DGD, overall torque modulation is simply achieved with another control loop. This loop operates outside of the torque-balancing loop and looks at the net current being produced (i.e. $I_{total}$ in FIG. 2) to control the total reaction torque produced by the generators. When the SCR-T controller sees a rising current, it responds by lowering its torque command to the SCR control boards, which in turn reduces the duty cycle on the signals to the SCRs. The net effect is that rising current (indicating rising input torque) causes the controller to command a decrease in generator reaction torque and an increase in slip. The ability to vary reaction torque in response to wind gusts or current surges allows the energy in the gust or surge to be converted to rotor inertia. The lowered reaction torque produces increased generator slip and thus higher rotor speed. As the gust or surge passes, the controller then increases the reaction torque back to its nominal value, thereby reducing the slip, and the excess rotational inertia is converted into torque. The significant value of this control strategy is that torque spikes caused by gusts or surges which would normally be borne directly by the drivetrain, are instead converted to rotor inertia and then converted to torque when the input torque spike has diminished. Essentially, the rotor is momentarily being used as a flywheel to store excess energy until the input loads come back down to nominal, at which point this inertial energy is allowed to enter the drivetrain. Aside from smoothing the gust or current surge effect on the output power, reducing the magnitude of torque spikes experienced by the mechanical components in the drive train reduces spike induced damage and/or allows the gearbox to be designed for lower peak loading. This control method, then, applies to multiple, induction generator powertrains such as the DGD, with torque balancing being conducted between generators, as well as to systems with only a single induction generator and drivetrain (which, of course, does not utilize a torque balancing algorithm). In all cases this gust/surge control algorithm has the effect of smoothing momentary, excess torque events and reducing the peak torque carried by the powertrain.

While the invention has been particularly shown and described with reference to preferred embodiments thereof, it will be understood by those skilled in the art that the foregoing and other changes in form and detail may be made therein without departing from the scope of the invention.

What is claimed is:

1. For use with an electric power-generating device that converts fluid flow of wind or water to electricity including a rotor having blades that rotate in response to fluid flow; a main power input shaft coupled to said rotor; a single-stage torque-dividing gearbox coupled to said main power input shaft; said torque-dividing gearbox having a plurality of output shafts located around a perimeter of said main power input shaft; and, a plurality of sub-powertrains, each one of said sub-powertrains including a generator coupled to a respective one of said output shafts, each said generator having a local generator voltage output, a controller method comprising:

Connecting, for each generator, a transformer configured as a reactor, each transformer being connected to a respective local generator voltage output; and, Regulating torque experienced by each said generator to assure that torques are balanced between generators at any given system load by actively modulating said transformer.

2. The method of claim 1 wherein said coils of said transformers are wired in parallel and are actively modulated with a solid-state switching device.

3. The method of claim 2 wherein each generator is connected to a respective primary coil of a transformer and a respective secondary coil of a transformer is connected to said solid-state switching device.

4. The method of claim 1 wherein each generator has a slip characteristic and said regulating step includes modifying said slip characteristic of each generator to match a generator with the greatest slip.

5. In a system of mechanically coupled multiple induction generators driven by a single rotor, a main power input shaft coupled to said rotor; a single-stage torque-dividing gearbox coupled to said main power input shaft; said torque-dividing gearbox having a plurality of output shafts located around a perimeter of said main power input shaft; each of said multiple induction generators being coupled to a respective one of said output shafts, each said generator having a local generator voltage, a method comprising steps of:

A. Monitoring torque on each individual generator;
   B. Determining relative torque balance between said multiple generators;
   C. Modifying torque characteristics of said individual generators to bring said generators into balance to provide uniform torque load distribution between said multiple generators;
   D. Modifying overall torque characteristics of said multiple induction generators by sensing rising net current produced by said multiple induction generators; and,
   E. Commanding a decrease in total generator reaction torque by modulating transformers connected to outputs of said multiple induction generators in response to said sensing rising net current.

6. The method of claim 2 wherein said regulating step includes pulse width modulation of said solid-state switching device.

7. The method of claim 2 wherein said solid-state switching device is a silicon controlled rectifier.

8. The method of claim 3 wherein said solid-state switching device is a silicon controlled rectifier.

9. The method of claim 5 wherein each generator has a slip characteristic and said regulating step includes modifying said slip characteristic of each generator to match a generator with the greatest slip.

10. The method of claim 5 wherein each generator has a slip characteristic and said commanding step includes increasing said slip characteristic of each generator to decrease said generator reaction torque.

* * * * *